Jan. 18, 1955  G. E. GUNDERSON  2,699,841
SPEED CHANGING UNIT AND LUBRICATING MEANS THEREFOR
Filed Dec. 17, 1949  4 Sheets-Sheet 2
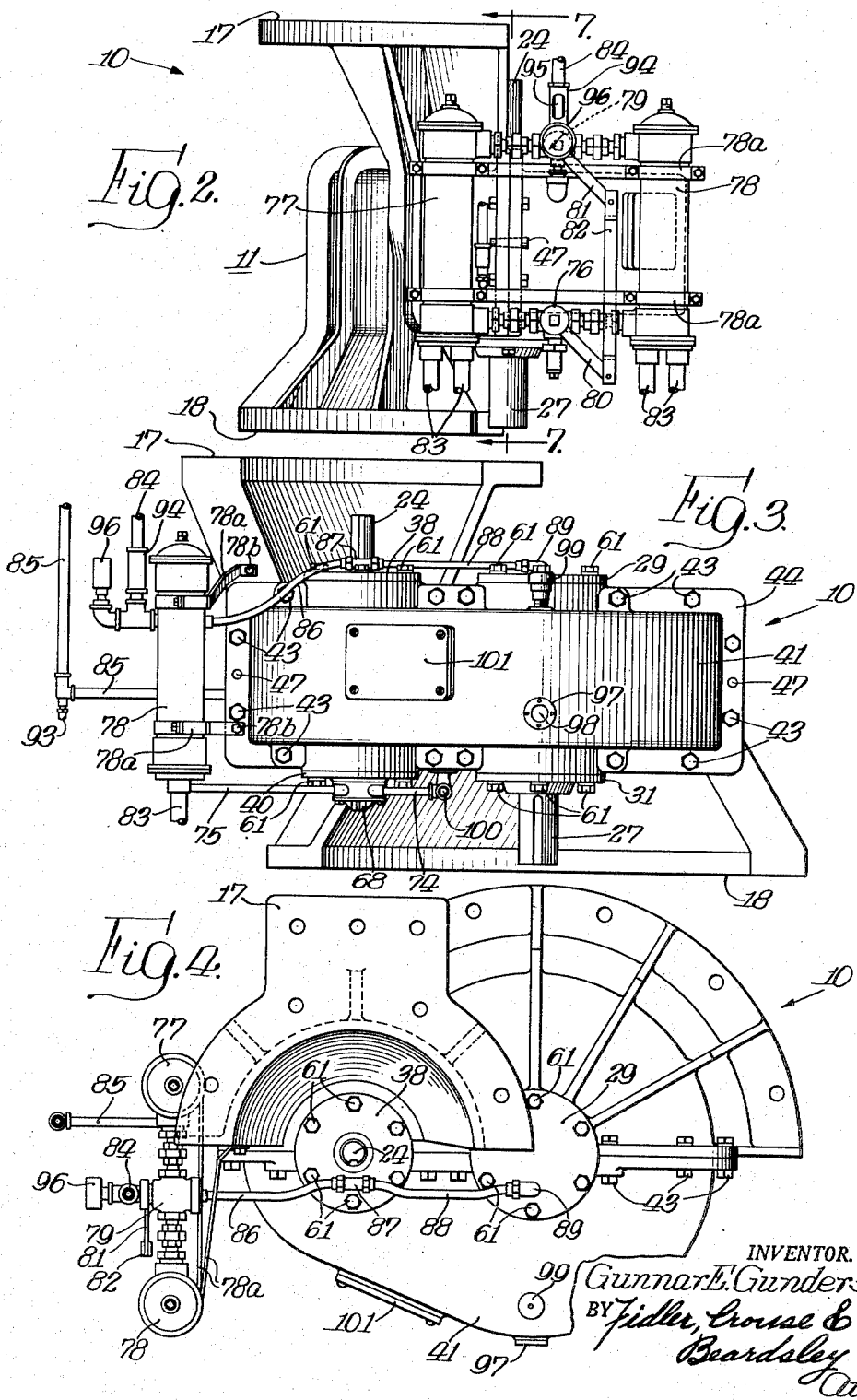
INVENTOR.
Gunnar E. Gunderson
BY Fidler, Crouse &
Beardsley
Attys.

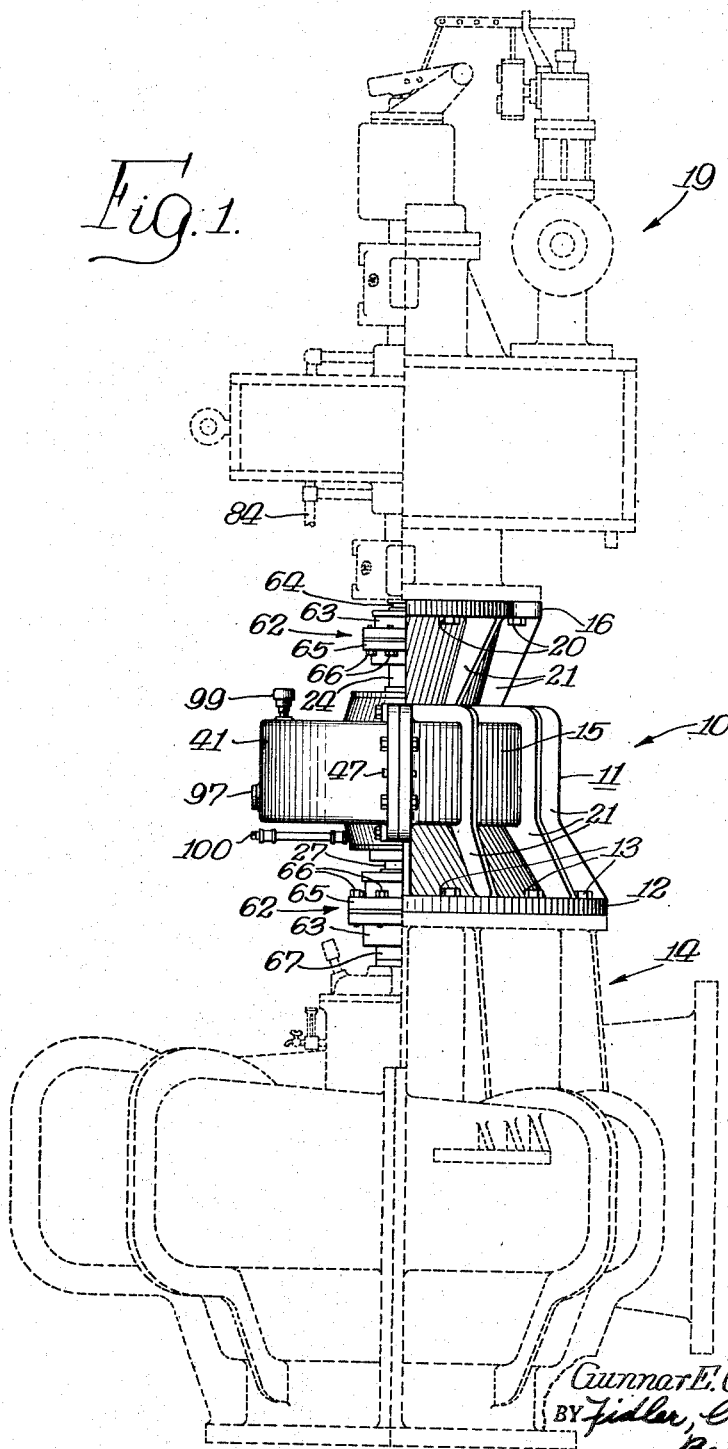

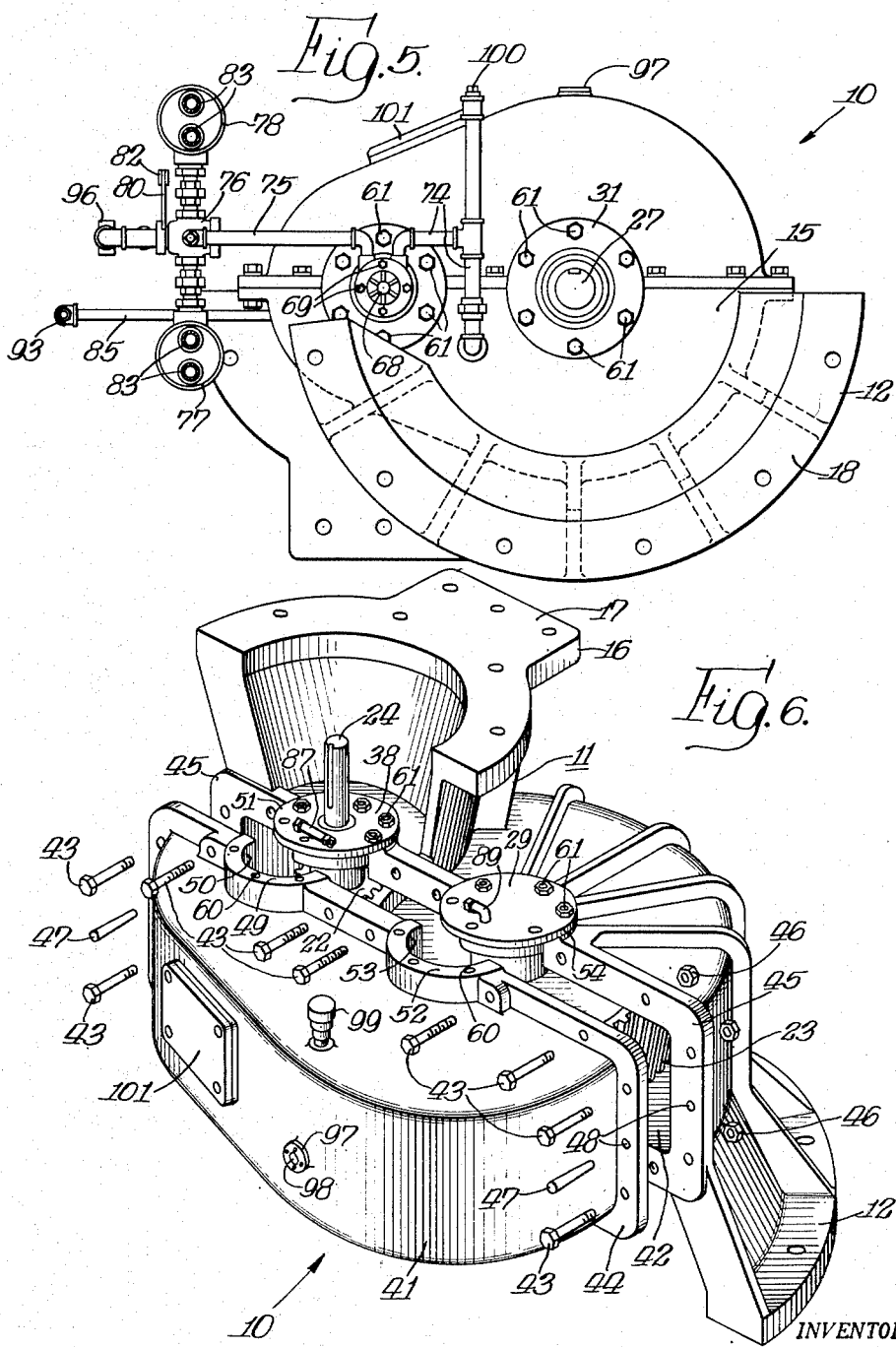

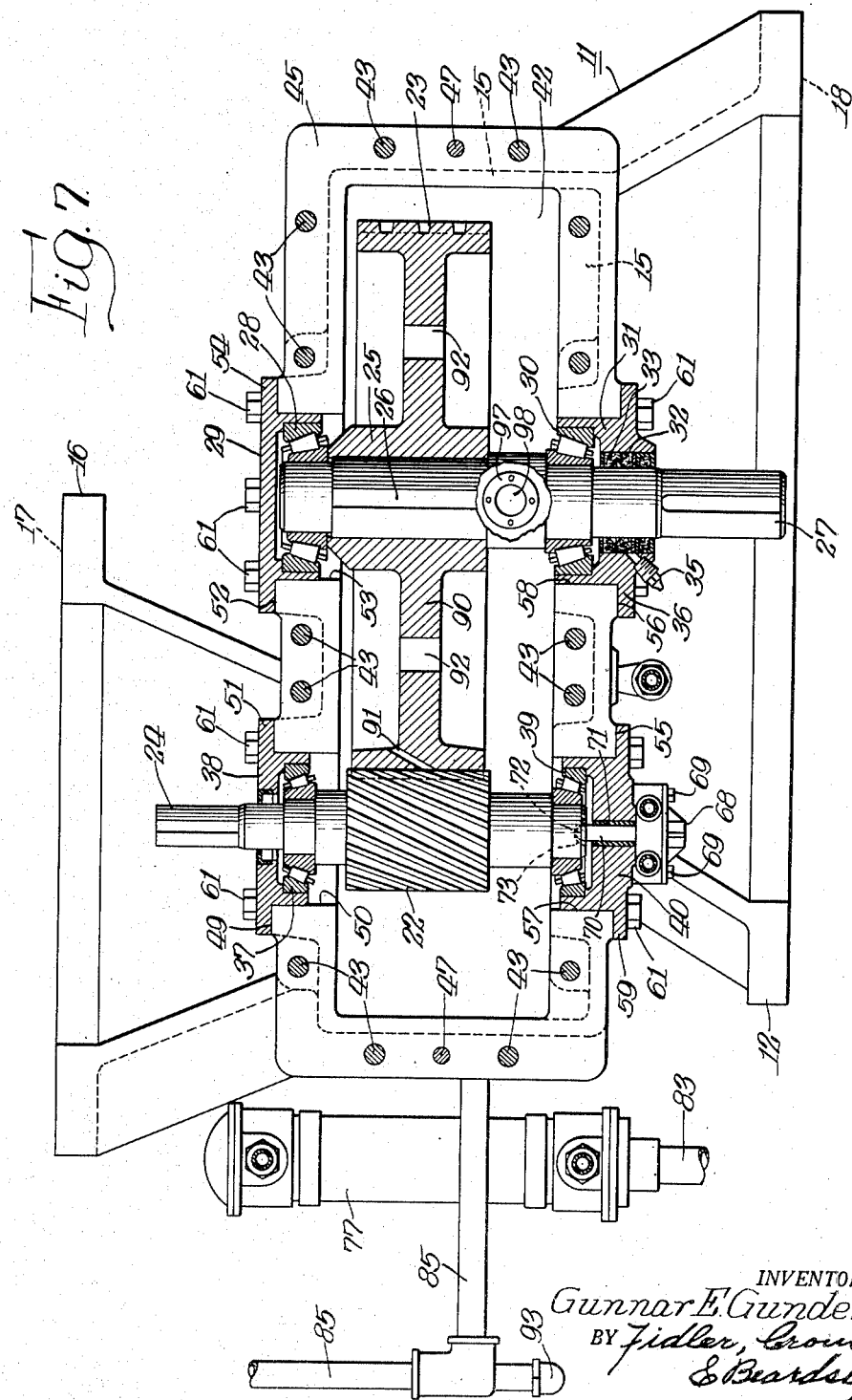

United States Patent Office 2,699,841
Patented Jan. 18, 1955

2,699,841

SPEED CHANGING UNIT AND LUBRICATING MEANS THEREFOR

Gunnar E. Gunderson, Lemont, Ill., assignor to Brad Foote Gear Works, Cicero, Ill., a corporation of Delaware Application December 17, 1949, Serial No. 133,582

9 Claims. (Cl. 184—6)

This invention relates to speed changing units and it more particularly concerns a gear type of speed reducing unit.

Generally, speed changing units are of the speed reduction type wherein their driving or power input shafts are rotatably driven at a comparatively greater speed than their driven or power output shafts; however, it will become manifest that the driver and driven elements associated with my unit may be substituted, one for the other, without departing from the spirit and scope of the invention. Such devices usually are interposed between driver and driven elements, and heretofore it has been the practice to arrange the system with its components in horizontal relation and with at least one of the associated elements independently supported of the speed changing unit, for example on a platform or the floor. Considerable floor space has been required for installations of this type. Further, the independently supported element or elements of such a system necessarily must be aligned as accurately as possible, such as by means of shims, with the speed changing unit to prevent destructive vibration which would be occasioned at high speed by misalignment in the system.

Marine installations requiring the use of speed changing units are concerned particularly with the conservation of floor space, accessibility, durability and ease of replacement of those parts which normally are expected to be subject to wear. Obviously, it is desirable to be able to replace worn or broken parts in a speed changing unit in the least time possible and without completely dismantling the unit. Further, the replacement of parts in such a device should not disturb its aligned relation with the driven or driver elements for the device. Accordingly, one of the objects of this invention is to provide an improved speed changing unit particularly adaptable to marine installation but not necessarily limited in this respect.

Another object is to provide an improved casing for a speed changing unit.

An additional object is to provide a speed changing unit which is adapted to be interposed between associated driver and driven elements disposed in vertical stacked relation.

A further object is to provide a speed changing unit with a casing adapted to support the unit in fixed relation to both the driver and driven elements for the unit.

A still further object is to provide a speed changing unit of the foregoing character with a casing having a removable section permitting access to the interior of the unit without disturbing the aligned relation of the unit with its associated driver and driven elements.

Additional and more specific objects are to provide a speed changing unit in which either or both the power input shaft with its pinion gear and the power output shaft with its driven gear, the bearings for said shafts and all moving parts of the unit may be replaced while the unit is maintained in operative, aligned relation with the associated driver and driven elements connected to the unit by means of its casing structure; to provide a unit that may be serviced at its place of use; and a unit that is adapted to rest upon and to be secured to the top of the driven element, such as a pump, and to support and have secured to its top side the driver element, such as a turbine.

Other objects and advantages of the invention will become apparent from the following description considered in conjunction with the appended drawings wherein:

Figure 1 is a side elevational view of a speed changing unit embodying my invention and illustrating the unit in association with a driver and driven element shown in broken lines;

Fig. 2 is an elevational view showing the opposite side of the speed changing unit illustrated in Fig. 1;

Fig. 3 is a front elevational view of the speed changing unit shown in Fig. 1;

Fig. 4 is a top plan view of the speed changing unit shown in Fig. 1;

Fig. 5 is a bottom plan view of the speed changing unit shown in Fig. 1;

Fig. 6 is a perspective view of the speed changing unit as seen from a point thereabove and showing the unit in partially exploded condition; and Fig. 7 is a vertical, sectional view taken along the line 7—7 of Fig. 2.

A preferred embodiment of the invention is shown in the drawings wherein a speed changing unit 10 (Fig. 1) is provided with a main casing 11 having a flange-base portion 12 for supporting the unit and whereby the unit may be removably fastened as by bolts 13 to the machine or element to be driven by the speed changing unit. By way of illustration, the unit 10 is shown secured to the top side of a pump 14 of the type having utility for example in marine engine rooms.

Main casing 11 extends generally upwardly and inwardly from the flange-base portion 12 to join with an arcuate-shaped chamber portion 15, from the top side of which the main casing extends generally upwardly and outwardly and terminates in a flange-top portion 16. Flange portion 16 has a generally semicircular flat top surface 17 (Figs. 4 and 6) which is disposed parallel with a flat surface 18 (Fig. 5) provided on the underside of lower flange portion 12, whereby driver means, for example a steam turbine 19 (Fig. 1) for unit 10, may be secured as by bolts 20 to the main casing 11 in vertical stacked and aligned relation with the unit 10 and with the pump 14. Suitable strengthening ribs 21 are preferably cast integrally with the walls of the main casing 11 and provide the required strength and rigidity to support the driver turbine 19 and to resist torsional forces acting on the main casing during operation of the unit. It is apparent that the speed changing unit 10 requires no floor space, it being mounted vertically on the top side of the driven pump 14. Further, the unit 10 being adapted to support the driver turbine 19 on its upper flange surface 17, the turbine likewise requires no floor space for its support and the entire system will occupy no additional floor space over that which would normally be required for one of the elements of the system.

Speed changing means is supported partially within the chamber portion 15 of the main casing 11 and comprises a drive pinion 22 (Fig. 7) meshed with a driven pinion 23. Drive pinion 22 has its teeth formed integrally with a drive or power input shaft 24 while the pinion 23 has its hub portion 25 secured as by a key (not shown) and keyway 26 to a driven or power output shaft 27. The speed changing unit 10 shown in the drawings is provided with a gear ratio of approximately 5.45 to 1, drive pinion 22 having eighteen helical teeth meshed with ninety-eight helical teeth on the driven pinion 23, whereby when the power input shaft 24 is rotated at 3600 R. P. M. by the turbine 19, the power output shaft 27 will be rotated at approximately 661 R. P. M. to drive the pump 14 accordingly. The stated number of teeth, ratio and input speed are given only as an example of one application for the speed changing unit 10, it being understood that these factors as well as the turbine 19 and the pump 14 may be changed in accordance with the desired application of the device without departing from the spirit and scope of the invention.

Bearing means is provided for the rotatable elements of the speed changing unit 10 and comprising a well known type of roller bearing unit 28 (Fig. 7) journaling the upper end of the power output shaft 27 and being seated in a bearing retainer-cap 29. A similar roller bearing unit 30 journals the lower portion of the power output shaft 27 and it is received in a bearing retainer-bushing 31. The lower end of the power output shaft 27 extends through the retainer-bushing 31 and beyond chamber portion 15 to a point short of a plane containing flange surface 18. Bearing retainer-bushing 31 is shaped to provide an annular space 32 intermediate the lower roller bearing unit 30 and the lower end of the bearing retainer-bushing for snugly receiving an oil seal element 33, confined within the annular space 32 by any suitable means, which seal prevents the leakage or escape of oil from the gear chamber around the power output shaft 27. A well known type of lubrication fitting 35 is located in a flange portion 36 of the bearing retainer-bushing 31 and communicates with the oil seal element 33 whereby the seal element may be lubricated by the introduction of a lubricating material into the open end of the fitting.

Bearing means is also provided for the power input shaft 24 and comprises a roller type of bearing unit 37 journaling the upper portion of the power input shaft and it is seated in an upper bearing retainer-bushing 38. The upper end of the power input shaft 23 projects through and beyond the upper bearing retainer-bushing 38 to a point short of a plane containing the surface 17 of the upper end of the main casing 11. Power input shaft 24 has its lower end journaled in a roller bearing unit 39 which is received in a second, lower bearing retainer-bushing 40; however, the lower end of the power input shaft projects only slightly beyond the lower surface of the bearing unit 39.

A second casing element 41 is shaped complementary to the main casing chamber portion 15 and is adapted to be secured to the main casing 11 to provide a closed gear chamber 42. The casing element 41 is removably secured to the main casing 11 by suitable fastening means, such as by bolts 43, disposed in spaced relation around the outside of the gear chamber 42 and which are received in registering openings in facing flanges 44 and 45, respectively, formed on casing element 41 and main casing 11. Nuts 46 threaded on the bolts 43 maintain the facing flanges 44 and 45 of the casing structure in oil-tight relation. Tapered pins 47 (Fig. 7) are wedgedly driven through suitably sized, registering openings 48 in the facing flanges 44 and 45 of the two casing members and at each side thereof to position the casing members in a fixed predetermined relation and whereby upon removal of the element 41 and replacement thereof it will again assume its predetermined relation with the main casing 11. When the unit 10 is assembled in the first instance, the two casing elements 11 and 41 are bolted together loosely and the tapered pins 44 are driven into position, after which the bolts 43 and nuts 46 are tightened. With the casing elements secured in this manner, a flat surface 49 (Figs. 6 and 7) is machined on the upper side of the gear chamber 42 to provide a seat surrounding a circular opening 50 disposed and defined by and between the two casing sections 11 and 41 for receiving the underside of a flange portion 51 of the upper bearing retainer-bushing 38 for the power input shaft 24. A similar flat surface 52 is machined at the end of a similar circular opening 53 formed by the adjoining casing elements for receiving a flange portion 54 of the upper bearing retainer-cap 29 for the upper end of the power output shaft 27. Also, similar flat surfaces 55 and 56 are machined respectively on the underside of the gear chamber 42 at similar circular openings 57 and 58 for respectively receiving a flange portion 59 of the lower bearing retainer-bushing 40 and the flange portion 36 of the bearing retainer-bushing 31 for the power output shaft 27. Each of these machined surfaces 49, 55 and 52, 56, is disposed normal with the axes of the respective power input and power output shafts 24 and 27 with which it is associated, and has threaded openings 60 (Fig. 6) circumferentially disposed to receive suitable fastening means, such as bolts 61 for fastening the several bearing retainer-bushings and bearing retainer-caps to both the main casing 11 and to the casing element 41.

My speed changing unit 10 is provided with separable coupling means for operatively coupling the unit with the turbine 19 and the pump 14. A preferred form of such means is comprised of a separable coupling 62 (Fig. 1) having its one section 63 fixed to the end of a driver shaft 64 forming a part of the turbine 19 and being disposed in coaxial and spaced relation with the end of the power input shaft 24 of the speed changing unit. A second and separable section 65 of the separable coupling 62 is slidably carried on the upper end portion of the power input shaft 24 and is keyed thereto in a well known manner to prevent relative angular movement of the coupling section 65 with the shaft 24. Slidably supported coupling section 65 may be moved axially outwardly of the power input shaft 24 and into intimate contact with coupling section 63 and may be securely fastened thereto by suitable fastening means such as by bolts 66 threadedly received in the flange portions of the respective coupling sections 63 and 65.

A similar separable coupling 62 is associated with the power output shaft 27 and a shaft 67 projecting upwardly from the pump unit 14. It is understood that the axially movable section 65 of either or both separable couplings 62 may be slidably supported on the respective power shafts of the speed changing unit 10 or on the shaft associated with either the turbine 19 or the driven pump 14.

Means is provided to supply cooled oil under pressure for lubricating moving parts of the speed changing unit 10. The pressure forming means comprises an oil pump 68 (Fig. 7) which is adapted to be secured to the lower side of bearing retainer-bushing 40 in coaxial relation therewith by suitable fastening means such as bolts 69, threaded into retainer-bushing 40. A pump rotor 70 projects upwardly from the pump 68 and is journaled in a bushing 71, press-fitted into the open, lower end of the bearing retainer-bushing 40. Rotor 70 extends upwardly beyond the bushing 71 and is formed with a blade-like end portion 72 removably received in a complementary-shaped notch 73 provided in the lower end of the power input shaft 24. Oil pump 68 may be easily replaced or removed from the speed changing unit 10, simply by removing the bolts 69 and any oil lines that may be connected to the pump and then by withdrawing the oil pump and its rotor 70 from the bushing 71.

Lubricating oil is pumped from a supply maintained in the gear chamber 42 through a pipe line 74 (Figs. 3 and 5) connecting the pump in fluid-communicating relation with the interior of chamber portion 15 and is delivered under pressure from the oil pump 68 by means of a conduit 75 to an adjustable 3-way valve 76 (Fig. 2). Valve 76 may be adjusted for selective fluid-communicating relation with the input ends of a pair of heat exchanger units 77 and 78, for example to allow oil to flow to either selected one of the heat exchanger units or to both heat exchanger units simultaneously. The heat exchanger units are preferably supported on the frame of the speed changing unit and for this purpose I provide strap-iron supports 78a encircling the heat exchanger units and bolted to the frame as by bolts 78b. A similar 3-way valve 79 is provided with suitable conduits connecting it with the output ends of the respective heat exchanger units 77 and 78 and preferably is selectively adjustable simultaneously with 3-way valve 76. Interconnected adjusting means accomplishing such simultaneous adjustment is comprised of an adjusting arm 80 having its one end secured to the adjustable structure of valve 76 and an adjusting arm 81 having its one end secured to the adjustable structure of valve 79. The outer end of each valve adjusting arm 80 and 81 is pivotally supported on the respective ends of an interconnecting bar 82, whereby both adjusting arms are moved simultaneously to equal angular extents, for example by manual movement of the bar 82, and the flow of oil through the heat exchanger units 77 and/or 78 is selectively controlled by the adjusted 3-way valves.

The heat exchanger units 77 and 78 preferably are of the type employing circulating water as a heat exchange medium. Accordingly, suitable water supply and return pipes 83 are provided for the respective heat exchanger units 77 and 78 to cool the lubricating oil in a well known manner as it flows through either or both heat exchanger units. Cooled oil under pressure may be conducted by a feed conduit 84 from the 3-way valve 79 to the turbine 19, to the pump 14 (connections not shown) or to other machinery requiring lubrication, provided the capacity of the oil pump 68 is not exceeded and, further, that means is provided to return the circulating oil to the gear chamber 42. An oil return line, such as conduits 85, may lead from the turbine 19 and enter the side wall of the gear chamber portion 15 of the casing 11 to complete a flow circuit for the lubricating oil from gear chamber 42 to the turbine 19 and return to the gear chamber. Cooled oil is also fed under pressure to the roller bearing units 28 and 37 from the 3-way valve 79 by means of a conduit 86 (Figs. 3 and 4) connected to one leg of a T-fitting 87 supported in the bearing retainer-bushing 38 and having a conduit 88 connecting its other leg with a suitable fitting 89 supported in the bearing retainer-cap 29 whereby these roller bearing units are lubricated.

Cooled lubricating oil then flows through the bearing unit 37 and under the action of gravity onto the upper ends of the teeth of drive gear 22. Similarly, cooled oil under pressure is forced through the bearing unit 28 and by the action of gravity it is caused to flow down the sides of hub portion 25 of driven pinion 23. Pinion 23, by its rotary movement, causes the oil to move radially outwardly along a web portion 90 of the pinion and to flow through suitable openings, such as an oil port 91 (one shown), to lubricate the teeth of the driving and driven pinions. Transverse openings 92 in the web portion 90 of the gear allow some of the oil to drop directly to the lower portion of gear chamber 42 and prevent the accumulation of an excess quantity of oil on the upper surface of the web portion. Obviously, it would be undesirable to permit a pressure to develop on the oil within the gear chamber 42 much in excess of atmospheric pressure. Accordingly, a pressure relief valve 93 is interposed in the oil return line 85 and functions in a well known manner to prevent the building-up of excessive pressure within the gear chamber 42.

Means is provided to observe and determine the flow, pressure and oil level in the lubricating system. The flow observation means comprises a flow gauge 94 (Figs. 2 and 3) interposed in the oil feed line 84 and having a transparent wall-portion 95 whereby movement of the oil in the line may be observed to determine that it is circulating properly in the system. An oil pressure gauge 96 is connected in communicating relation with the oil conduit 84 and indicates the pressure maintained in the oil feed system by the oil pump 68. It is desirable to maintain a sufficient quantity of oil in the gear chamber 42 at all times to insure proper lubrication. The oil level in gear chamber 42 may be observed by means of an oil level gauge 97 supported in a side wall of the casing element 41 and having a transparent window portion 98 disposed at the desired oil level that is to be maintained in the chamber. When it is desired to raise the oil level in gear chamber 42, a filler cap element 99, provided on the top of casing element 41, may be removed to uncover an opening through the wall of the casing whereby oil may be added to raise the oil level in the chamber. At times it may be desirable to drain the oil from the gear chamber 42, especially after long periods of use or when the speed changing unit 10 is to be dismantled. For this purpose, a drain plug 100 (Figs. 1, 3 and 5) is preferably, removably supported in a portion of the oil line 74 leading from the bottom of the gear chamber 42 to the oil pump 68 because of its low position with respect to other portions of the oil conveying system.

Means is provided to allow access to the interior of gear chamber 42 which comprises a removable inspection cover 101 bolted to the side of the casing element 41 above the normally maintained oil level in gear chamber 42, whereby upon removal of the cover, inspection of the bearings, gears, etc., of the speed changing unit 10 may be made without draining the oil from the device and without removing the entire casing element 41 from the main casing 11.

An important feature of my speed changing unit 10 resides in its structural design permitting ready removal and replacement of the moving parts of the unit. For example, should it be necessary to replace one of the bearing units 28, 30, 37 or 39, the power input shaft 24 or the power output shaft 27, this may be done without disturbing the axially aligned relation of either the turbine unit 19 or the pump unit 14 with the speed changing unit 10. Heretofore, when it became necessary to replace a part of the foregoing character in prior types of speed changing units, the speed changing unit not only had to be substantially completely disassembled but also had to be removed from its operative relation either with its associated driver turbine, its associated driven pump or both before disassembly became possible. Attention is directed particularly at this time to the fact that in the following description concerning the mode of replacing parts in my speed changing unit neither the bolts 13 (Fig. 1) nor the bolts 20 are disturbed. Therefore, the main frame 11 of my unit 10 is maintained in fixed relation with the frames of both the turbine 19 and the pump 14 and operative alignment in the system is not disturbed.

When it becomes necessary to replace one or more of the movable parts in my speed changing unit 10 certain preliminary disassembly steps are required. For example, oil drain plug 100 should be removed to allow the oil to drain from the gear chamber 42, and oil conduits 86 and 88 should be disconnected from the respective pipe fittings 87 and 89. Next, I have found it to be advisable to remove bolts 66 (Fig. 1) to separate both separable couplings 62 to disconnect both the power input shaft 24 from the driver shaft 64 of the turbine and the power output shaft 27 from the driven shaft 67 of the pump, irrespective of the fact that the servicing operation may concern only one of the shafts of the speed changing unit, for example, the power input shaft 24 and its associated bearing units 37 and 39. Next, only those bolts 61 which fasten the bearing retainer-bushings 31, 38, 40 and bearing retainer-cap 29 to case element 41 are removed, and the remaining bolts 61 are loosened slightly. All cap screws or bolts 43 securing the casing element 41 to the main casing 11 are removed as well as the tapered positioning pins 47. Housing or casing element 41 then may be lifted from the speed changing unit 10 exposing all moving parts of the unit and approximately one-half of the outer circumferential surfaces of the bearing retainer-bushings 31, 38, 41 and of bearing retainer-cap 29.

Should the servicing operation concern replacement of power input shaft 24 with its integral pinion 22, the remaining bolts 61 are removed from only the bearing retainer-bushing 38. The upper end of the power input shaft 24 then may be tilted slightly out of vertical sufficiently to allow the shaft to be moved upwardly and withdraw its lower end from the lower bearing retainer-bushing 40. During the removal of the power input shaft 24 from the unit 10, both the turbine unit 19 and the pump unit 14 remain bolted to the main casing 11 of the unit 10 and the original alignment of the system is maintained. This would not be true if it were not for the fact that the main casing 11 provides the means for securing the speed changing unit 10 to both the frame of the turbine 19 and the frame of the pump 14 and, at the same time, defines the means for aligning the power input shaft 24 with the turbine. It is manifest that either bearing unit 37 or 39 may be serviced while power input shaft 24 is separated from the speed changing unit 10 and that such separation does not require the removal of the lower bearing retainer-bushing 40.

Power output shaft 27 and its associated pinion 23 may also be removed from the speed changing unit in a manner similar to that described for removal of the power input shaft 24. However, to remove the power output shaft 27, bolts 61 securing the upper bearing retainer-cap 29 as well as the lower bearing retainer-bushing 31 to the main casing 11 are removed. Power output shaft 27 may then be lifted from the main casing 11 and may be serviced and then be returned into its proper relation with the speed changing unit 10 as well as with the driven pump 14.

Re-assembly of the power input shaft 24 and/or the power output shaft 27 in my speed changing unit 10 may follow the above sequence of steps for disassembly except that the mode of procedure would be in a reverse order and, necessarily, lubricating oil should be placed in gear chamber 42 through the means provided by oil filler cap 99. It will be noted that no re-aligning steps are required during re-assembly of the device. Further, the coaxial alignment of power input shaft 24 with the turbine 19 and that of the power output shaft 27 with the pump 14 will be precisely as accurate as existed before the speed changing unit was dismantled.

In prior, customary installations having a driver unit, a speed changing unit and a driven unit disposed in horizontal and individually supported alignment, it has been the practice to completely separate the driver element, such as a turbine, or the driven element, such as a pump, from the speed changing unit when it became necessary to service the speed changing unit. Upon replacement of the prior type of speed changing unit after a servicing operation, it became necessary to resort to the use of shims or other equivalent means to realign the separated unit or units with the speed changing unit. This involved considerable lost time and accuracy of alignment of the parts was dependent entirely upon the skill of available workmen. My speed changing unit 10 is accurately aligned with the driver and driven element in the first instance and this relationship is maintained even though the unit be disassembled completely. The ease of replacement of the moving parts of my speed changing unit is particularly important in marine installations. In the past it has been necessary at times to defer the making of such needed repairs until the ship was at dock or in drydock, unless a complete speed changing unit was carried as a replacement unit and even then the alignment problems encountered in replacing such a unit at sea can readily be appreciated. By providing a unitary main frame for my unit and a removable sub-frame, both of which serve to journal the power shafts, maximum ease of replacement of those parts subject to normal wear is permitted. One end of the main frame of my unit being adapted to receive and secure the unit to the driven element and its other end being adapted to receive and secure the driver element, the entire system is connected together in fixed relative alignment and may be disposed vertically for conservation of floor space.

I claim:

1. A frame structure for a speed changing unit having a power input shaft and a power output shaft, said frame structure comprising a main frame having a base portion, a head portion, and an intermediate portion defining a first gear chamber section having an open side, said base and head portions respectively having a plane base-surface and a plane head-surface, said open side of said first gear chamber being disposed in a plane normal with said head and base surfaces, and a frame element removably secured to said intermediate portion of said main frame and defining a second gear chamber section having an open side in registry with said open side of said first gear chamber section, said power input and power output shafts being journaled in the edges of the respective ones of said open sides of said first and second gear chamber sections and being disposed normal with said head and base surfaces.

2. In a speed changing unit adapted to be operated by a driver element to operate a driven element, a main frame having a centrally disposed, hollow portion with one open side and having means extending from said portion for fastening of the speed changing unit to the driver element and the driven element in predetermined fixed relation therewith, a removable casing supported on said main frame, said casing being hollow and having an open side disposed in registration with the open side of said main frame portion and forming therewith a closed chamber, a power output shaft removably connected to the driven element, a power input shaft removably connected to the driver element, said power output and power input shafts being disposed relatively parallel and extending into said gear chamber with the axis of at least one of said shafts lying on the plane of said one open side, said one of said shafts being removably supported in said speed changing unit by the registering portions of said removable casing with said centrally disposed portion of said main frame, and a pair of gears disposed in said chamber and respectively supported on said power input and power output shafts, whereby the driver element will cause the speed changing unit to operate the driven element and the said one of said power shafts will be journaled by both said main frame and said casing.

3. In a speed changing unit adapted to be operated by a driver element to operate a driven element, a main frame having a centrally disposed, hollow portion with one open side and having means extending from said portion for fastening of the speed changing unit to the driver element and the driven element in predetermined fixed relation therewith, a removable casing supported on said main frame, said casing being hollow and having an open side disposed in registration with the open side of said main frame portion and forming therewith a closed chamber, a power output shaft removably connected to the driven element and extending into said chamber with its axis lying on the plane of said one open side, said power output shaft being removably supported in said speed changing unit by the registering portions of said removable casing with said centrally disposed portion of said main frame, a power input shaft removably connected to the driver element and extending into said chamber with its axis parallel with the axis of said power output shaft, and a pair of gears disposed in said chamber and respectively supported on said power input and power output shafts, whereby the driver element will cause the speed changing unit to operate the driven element and the said power output shaft will be journaled by both said main frame portion and said casing.

4. In a speed changing unit adapted to be operated by a driver element to operate a driven element, a main frame having a centrally disposed, hollow portion with one open side and having means extending from said portion for fastening of the speed changing unit to the driver element and the driven element in predetermined fixed relation therewith, a removable casing supported on said main frame, said casing being hollow and having an open side disposed in registration with the open side of said main frame portion and forming therewith a closed chamber, a power input shaft removably connected to the driver element and extending into said chamber with its axis lying on the plane of said one open side, said power input shaft being removably supported in said speed changing unit by the registering portions of said removable casing with said centrally disposed portion of said main frame, a power output shaft removably connected to the driven element and extending into said chamber with its axis parallel with the axis of said power input shaft, and a pair of gears disposed in said chamber and respectively supported on said power input and power output shafts, whereby the driver element will cause the speed changing unit to operate the driven element and said power input shaft will be journaled by both said main frame portion and said casing.

5. In a speed changing unit adapted to be operated at one speed by a driver element to operate a driven element at another speed, a main casing having a base portion for securing the speed changing unit to one of said elements, a head portion for securing the speed changing unit to the other of said elements, and a portion disposed intermediate said base and head portions and defining one portion of a gear chamber, a removable casing section supported on and in registry with said intermediate portion of said main casing and defining another portion of said gear chamber, a power input shaft extending into said gear chamber from one outer side thereof and disposed in coaxial alignment with the driver element, and a power output shaft extending into said gear chamber from an opposite outer side thereof from said power input shaft and being disposed in coaxial alignment with the driven element, both said power input shaft and said power output shaft being partially journaled in said intermediate portion of said main casing and partially journaled in said removable casing section, whereby upon removal of said removable casing section said power input and power output shafts may be removed while said driver and driven elements remain secured to said main casing.

6. In mechanism of the class described, the combination of a driver unit, a speed changing unit, and a driven unit, said units being disposed in end-to-end, linear relation, said speed changing unit having a main frame the opposite ends of which respectively are connected to said driver unit and to said driven unit to maintain said units in aligned relation, said main frame having an intermediate portion defining a first gear chamber section having an open side, a frame element removably secured to said open side of said main frame and defining a second gear chamber section having an open side in registration with said open side of said first gear chamber section, a power input shaft removably connected to said driver unit, and a power output shaft removably connected to said driven unit, said power shafts extending into said first and second gear chamber sections with their axes lying in the plane of said open side of said main frame, each of said power shafts being journaled partly in said removable frame element and partly in said main frame, whereby said power shafts may be removed from said speed changing unit by removal of said removable frame element while said driver unit and driven unit remain connected in aligned relation by said main frame of said speed changing unit.

7. In mechanism of the class described, the combination of a driver unit, a speed changer unit, and a driven unit, said units being disposed in vertical, stacked relation, said speed changer unit being disposed intermediate the other said units and having a main frame with its opposite ends respectively connected to said driver and driven units and maintaining all of said units in fixed, aligned relation, said main frame having an intermediate portion formed with walls defining a first gear chamber section having an open, vertically disposed side, a frame element removably secured to said walls of said intermediate portion and formed with walls defining a second gear chamber section having an open side in registration with said open side of said first gear chamber section, a power input shaft removably connected to said driver unit, and a power output shaft removably connected to said driven unit, said power shafts extending into said first and second gear chamber sections, respectively, with their axes lying in the plane of said vertical, open side of said first gear chamber section, each of said power shafts being journaled partly in said walls of said first gear chamber section and partly in said walls of said second gear chamber section, whereby said power shafts may be removed from said speed changer unit by removal of said removable frame element while said driver and driven units remain connected to said main frame in fixed, aligned relation therewith.

8. In a gear reduction unit having a rotatable power input shaft and a rotatable power output shaft, a main frame, said frame including means for rigidly fastening to and in predetermined fixed relation with mechanisms having operating elements respectively connectible with said shafts and having an intermediate portion defining a first portion of a gear casing, a second gear casing portion removably secured to said first gear casing portion, said first and second gear casing portions removably supporting a plurality of separate pairs of upper and lower bearing means journaling the respective shafts for rotation about non-horizontal axes, an oil pump removably supported on the underside of said first and second casing portions in coaxial alignment and in operative engagement with one of said power shafts, conduit means extending through the bottom wall of said first portion of said gear casing connecting the inside of said gear casing with the intake of said pump, a heat exchanger device supported on said main frame, and conduit means connecting at least one of said upper bearing means with said heat exchanger device and said pump whereby rotation of said one of said power shafts will operate said pump to pump oil from said gear casing, through said last named conduit means and heat exchanger device, to deliver cooled oil to at least said one of said upper bearing means.

9. In a gear reduction unit adapted to be operated by a driver device to operate a driven device, a main frame having a base portion for mounting said unit on the driven device, a head portion for supporting the driver device on the top of said unit, and an intermediate portion shaped to define substantially one-half of a gear chamber, a sub-frame removably secured to said intermediate portion of said main frame and shaped complementally therewith and forming substantially another one-half of said gear chamber, a power input shaft extending into said gear chamber and adapted to rotate about a non-horizontal axis to be operated by the driver device, a power output shaft extending into said gear chamber and adapted to rotate about a non-horizontal axis to operate the driven device, upper and lower bearing means for each of said shafts each partially supported by said intermediate portion of said main frame and partially supported by said sub-frame, an oil pump removably supported partially by each of said frames and disposed therebeneath in coaxial alignment with said power input shaft and having detachable driven connection therewith, conduit means extending through the bottom wall of said intermediate portion of said main frame connecting the inside of said gear chamber with the intake of said pump, and conduit means connecting said oil pump with both said upper bearing means, whereby operation of said power input shaft by the driver device will cause said oil pump to pump oil from said gear chamber and through said last named conduit means to both said upper bearing means.

References Cited in the file of this patent

UNITED STATES PATENTS

| | | |
|---|---|---|
| D. 138,776 | Lear | Sept. 12, 1944 |
| 1,554,081 | Garrett | Sept. 15, 1925 |
| 1,749,077 | Kennedy | Mar. 4, 1930 |
| 1,782,912 | Snook | Nov. 25, 1930 |
| 1,813,819 | Ross | July 7, 1931 |
| 2,111,693 | Schnuck | Mar. 22, 1938 |
| 2,205,977 | Heyer | June 25, 1940 |
| 2,278,992 | Henderson | Apr. 7, 1942 |
| 2,332,274 | Slayter | Oct. 19, 1943 |
| 2,500,216 | Szekely | Mar. 14, 1950 |

FOREIGN PATENTS

| | | |
|---|---|---|
| 398,664 | France | June 11, 1909 |
| 473,068 | France | Dec. 30, 1914 |